US010425792B2

United States Patent
Chandrashekar et al.

(10) Patent No.: US 10,425,792 B2
(45) Date of Patent: Sep. 24, 2019

(54) VIRTUAL WIRELESS DEVICES FOR INDUSTRIAL WIRELESS SENSOR NETWORKS

(71) Applicant: Honeywell International Inc., Morris Plains, NJ (US)

(72) Inventors: Thejaswini Chandrashekar, Bengaluru (IN); Prasad Samudrala, Bangalore (IN); Amol Gandhi, Bangalore (IN)

(73) Assignee: Honeywell International Inc., Morris Plains, NJ (US)

( * ) Notice: Subject to any disclaimer, the term of this patent is extended or adjusted under 35 U.S.C. 154(b) by 44 days.

(21) Appl. No.: 15/629,681

(22) Filed: Jun. 21, 2017

(65) Prior Publication Data

US 2018/0376274 A1 Dec. 27, 2018

(51) Int. Cl.
| | |
|---|---|
| *H04W 4/00* | (2018.01) |
| *H04W 4/70* | (2018.01) |
| *H04B 17/391* | (2015.01) |
| *H04W 4/38* | (2018.01) |
| *G05B 19/418* | (2006.01) |

(52) U.S. Cl.
CPC ........ *H04W 4/70* (2018.02); *G05B 19/41855* (2013.01); *H04B 17/391* (2015.01); *H04W 4/38* (2018.02); *G05B 2219/31151* (2013.01)

(58) Field of Classification Search
CPC ............... H04L 63/0272; H04L 67/125; H04L 41/0806
See application file for complete search history.

(56) References Cited

U.S. PATENT DOCUMENTS

| | | | |
|---|---|---|---|
| 8,826,013 B1* | 9/2014 | Kodukula | G06F 21/53 380/279 |
| 8,943,222 B1 | 1/2015 | Scharler et al. | |
| 9,979,757 B1* | 5/2018 | Greenspan | H04L 65/403 |
| 2011/0158331 A1 | 6/2011 | Kavaler et al. | |
| 2014/0192804 A1* | 7/2014 | Ghanwani | H04L 49/70 370/390 |
| 2015/0032438 A1 | 1/2015 | Cohen et al. | |
| 2018/0027054 A1* | 1/2018 | Toepke | G05B 19/4185 709/222 |
| 2018/0203819 A1* | 7/2018 | Beitler | G06F 13/385 |

FOREIGN PATENT DOCUMENTS

CN 101841839 A 9/2010

* cited by examiner

*Primary Examiner* — Zhiren Qin

(57) ABSTRACT

This disclosure provides an apparatus and method for virtual wireless devices for industrial wireless sensor networks, including but not limited to, in industrial control systems and other systems. A method includes initializing, by a physical wireless device, a plurality of virtual wireless devices executing on the physical wireless device. The method includes registering with a control network by the physical wireless device. The method includes emulating a plurality of wireless sensors, by the physical wireless device and in the control network, by using the virtual wireless devices.

20 Claims, 6 Drawing Sheets

VIRTUAL WIRELESS DEVICES FOR INDUSTRIAL WIRELESS SENSOR NETWORKS

TECHNICAL FIELD

This disclosure relates generally to industrial systems. More specifically, this disclosure relates to implementing virtual wireless devices for wireless sensor networks, including but not limited to industrial wireless sensor networks.

BACKGROUND

Industrial systems can be implemented using networks of wireless sensors, among other devices. It can be difficult to effectively implement wireless sensor networks, since the installed network can be difficult to diagnose and repair when the wireless network grows to thousands of sensors. It is desirable to design and validate such a system before full installation.

SUMMARY

This disclosure provides an apparatus and method for virtual wireless devices for industrial wireless sensor networks, including but not limited to, in industrial control systems and other systems. A method includes initializing, by a physical wireless device, a plurality of virtual wireless devices executing on the physical wireless device. The method includes registering with a control network by the physical wireless device. The method includes emulating a plurality of wireless sensors, by the physical wireless device and in the control network, by using the virtual wireless devices.

Disclosed embodiments include a physical wireless device comprising a controller and a memory, configured to perform processes as described herein. Disclosed embodiments also include a non-transitory machine-readable medium encoded with executable instructions that, when executed, cause one or more processors of a system to perform processes as disclosed herein.

In various embodiments, the control network is an industrial control network or a simulated industrial control network. In various embodiments, each virtual wireless device includes an application layer that executes a wireless sensor application and includes a virtualized physical layer that interacts with wireless hardware of the physical wireless device. In various embodiments, each of the virtual wireless devices stores attributes of a physical wireless device, including at least one of a unique network address, a short address, a nickname, a manufacturer ID, model, a unique serial number and a unique device type identifier. In various embodiments, each virtual wireless device communicates over the control network using an assigned network address, short address, or nickname as if the virtual wireless device were a physical wireless device. Each virtual wireless device can have a dedicated non-volatile memory space in the physical device to store the user configuration; static data, etc. In various embodiments, registering with the control network includes sending a plurality of join messages, each corresponding to a different virtual wireless device, to the control network. In various embodiments, an emulated physical layer on each virtual wireless device is used to filter, send, and receive messages over the control network.

Other technical features may be readily apparent to one skilled in the art from the following figures, descriptions, and claims.

BRIEF DESCRIPTION OF THE DRAWINGS

For a more complete understanding of this disclosure, reference is now made to the following description, taken in conjunction with the accompanying drawings, in which.

DETAILED DESCRIPTION

The figures, discussed below, and the various embodiments used to describe the principles of the present invention in this patent document are by way of illustration only and should not be construed in any way to limit the scope of the invention. Those skilled in the art will understand that the principles of the invention may be implemented in any type of suitably arranged device or system.

Figure 1:
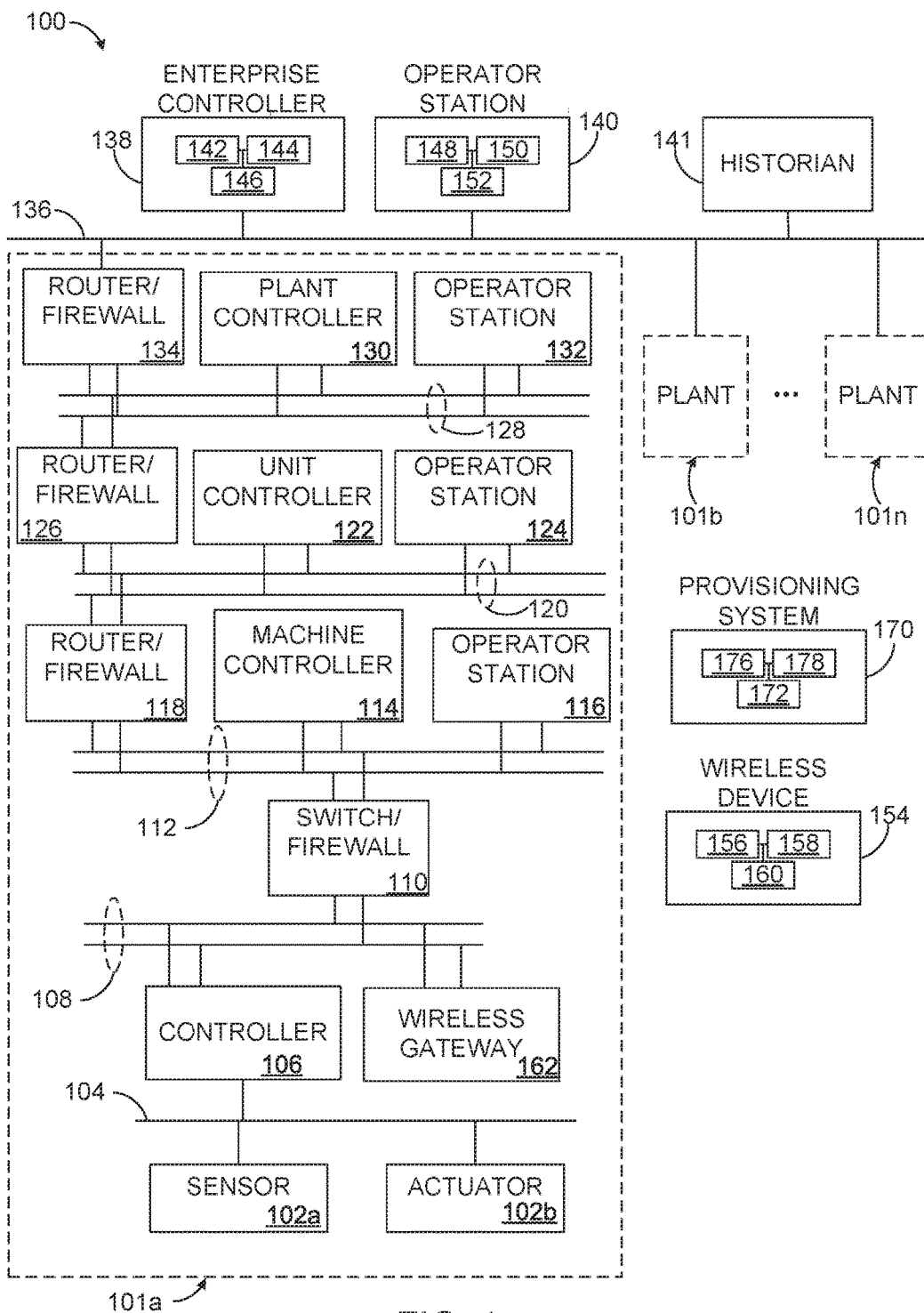
FIG. 1 illustrates an example industrial process control and automation system according to this disclosure.

FIG. 1 illustrates an example industrial process control and automation system 100 according to this disclosure. As shown in FIG. 1, the system 100 includes various components that facilitate production or processing of at least one product or other material. For instance, the system 100 is used here to facilitate control over components in one or multiple plants 101a-101n. Each plant 101a-101n represents one or more processing facilities (or one or more portions thereof), such as one or more manufacturing facilities for producing at least one product or other material. In general, each plant 101a-101n may implement one or more processes and can individually or collectively be referred to as a process system. A process system generally represents any system or portion thereof configured to process one or more products or other materials in some manner.

In FIG. 1, the system 100 is implemented using the Purdue model of process control. In the Purdue model, "Level 0" may include one or more sensors 102a and one or more actuators 102b. The sensors 102a and actuators 102b represent components in a process system that may perform any of a wide variety of functions. For example, the sensors 102a could measure a wide variety of characteristics in the process system, such as temperature, pressure, or flow rate. Also, the actuators 102b could alter a wide variety of characteristics in the process system. The sensors 102a and actuators 102b could represent any other or additional components in any suitable process system. Each of the sensors 102a includes any suitable structure for measuring one or more characteristics in a process system. Each of the actuators 102b includes any suitable structure for operating on or affecting one or more conditions in a process system.

At least one network 104 is coupled to the sensors 102a and actuators 102b. The network 104 facilitates interaction with the sensors 102a and actuators 102b. For example, the network 104 could transport measurement data from the sensors 102a and provide control signals to the actuators 102b. The network 104 could represent any suitable network or combination of networks. As particular examples, the network 104 could represent an Ethernet network, an electrical signal network (such as a HART or FOUNDATION FIELDBUS network), a pneumatic control signal network, or any other or additional type(s) of network(s). In specific embodiments as discussed herein, the network 104 is at least partially implemented as a wireless network, and the sensors 102a and actuators 102b are at least partially implemented using wireless devices.

In the Purdue model, "Level 1" may include one or more controllers 106, which are coupled to the network 104. Among other things, each controller 106 may use the measurements from one or more sensors 102a to control the operation of one or more actuators 102b. For example, a controller 106 could receive measurement data from one or more sensors 102a and use the measurement data to generate control signals for one or more actuators 102b. Each controller 106 includes any suitable structure for interacting with one or more sensors 102a and controlling one or more actuators 102b. Each controller 106 could, for example, represent a proportional-integral-derivative (PID) controller or a multivariable controller, such as a Robust Multivariable Predictive Control Technology (RMPCT) controller or other type of controller implementing model predictive control (MPC) or other advanced predictive control (APC). As a particular example, each controller 106 could represent a computing device running a real-time operating system.

Two networks 108 are coupled to the controllers 106. The networks 108 facilitate interaction with the controllers 106, such as by transporting data to and from the controllers 106. The networks 108 could represent any suitable networks or combination of networks. As a particular example, the networks 108 could represent a redundant pair of Ethernet networks, such as a FAULT TOLERANT ETHERNET (FTE) network from HONEYWELL INTERNATIONAL INC. A wireless gateway 162 can be connected to the network 108 (or to other networks described herein) and can communicate wirelessly with a wireless device 154 using known wireless communication techniques.

At least one switch/firewall 110 couples the networks 108 to two networks 112. The switch/firewall 110 may transport traffic from one network to another. The switch/firewall 110 may also block traffic on one network from reaching another network. The switch/firewall 110 includes any suitable structure for providing communication between networks, such as a HONEYWELL CONTROL FIREWALL (CF9) device. The networks 112 could represent any suitable networks, such as an FTE network.

In the Purdue model, "Level 2" may include one or more machine-level controllers 114 coupled to the networks 112. The machine-level controllers 114 perform various functions to support the operation and control of the controllers 106, sensors 102a, and actuators 102b, which could be associated with a particular piece of industrial equipment (such as a boiler or other machine). For example, the machine-level controllers 114 could log information collected or generated by the controllers 106, such as measurement data from the sensors 102a or control signals for the actuators 102b. The machine-level controllers 114 could also execute applications that control the operation of the controllers 106, thereby controlling the operation of the actuators 102b. In addition, the machine-level controllers 114 could provide secure access to the controllers 106. Each of the machine-level controllers 114 includes any suitable structure for providing access to, control of, or operations related to a machine or other individual piece of equipment. Each of the machine-level controllers 114 could, for example, represent a server computing device running a MICROSOFT WINDOWS operating system. Although not shown, different machine-level controllers 114 could be used to control different pieces of equipment in a process system (where each piece of equipment is associated with one or more controllers 106, sensors 102a, and actuators 102b).

One or more operator stations 116 are coupled to the networks 112. The operator stations 116 represent computing or communication devices providing user access to the machine-level controllers 114, which could then provide user access to the controllers 106 (and possibly the sensors 102a and actuators 102b). As particular examples, the operator stations 116 could allow users to review the operational history of the sensors 102a and actuators 102b using information collected by the controllers 106 and/or the machine-level controllers 114. The operator stations 116 could also allow the users to adjust the operation of the sensors 102a, actuators 102b, controllers 106, or machine-level controllers 114. In addition, the operator stations 116 could receive and display warnings, alerts, or other messages or displays generated by the controllers 106 or the machine-level controllers 114. Each of the operator stations 116 includes any suitable structure for supporting user access and control of one or more components in the system 100. Each of the operator stations 116 could, for example, represent a computing device running a MICROSOFT WINDOWS operating system.

At least one router/firewall 118 couples the networks 112 to two networks 120. The router/firewall 118 includes any suitable structure for providing communication between networks, such as a secure router or combination router/firewall. The networks 120 could represent any suitable networks, such as an FTE network.

In the Purdue model, "Level 3" may include one or more unit-level controllers 122 coupled to the networks 120. Each unit-level controller 122 is typically associated with a unit in a process system, which represents a collection of different machines operating together to implement at least part of a process. The unit-level controllers 122 perform various functions to support the operation and control of components in the lower levels. For example, the unit-level controllers 122 could log information collected or generated by the components in the lower levels, execute applications that control the components in the lower levels, and provide secure access to the components in the lower levels. Each of the unit-level controllers 122 includes any suitable structure for providing access to, control of, or operations related to one or more machines or other pieces of equipment in a process unit. Each of the unit-level controllers 122 could, for example, represent a server computing device running a MICROSOFT WINDOWS operating system. Although not shown, different unit-level controllers 122 could be used to control different units in a process system (where each unit is associated with one or more machine-level controllers 114, controllers 106, sensors 102a, and actuators 102b).

Access to the unit-level controllers 122 may be provided by one or more operator stations 124. Each of the operator stations 124 includes any suitable structure for supporting user access and control of one or more components in the system 100. Each of the operator stations 124 could, for example, represent a computing device running a MICROSOFT WINDOWS operating system.

At least one router/firewall 126 couples the networks 120 to two networks 128. The router/firewall 126 includes any suitable structure for providing communication between networks, such as a secure router or combination router/ firewall. The networks 128 could represent any suitable networks, such as an FTE network.

In the Purdue model, "Level 4" may include one or more plant-level controllers 130 coupled to the networks 128. Each plant-level controller 130 is typically associated with one of the plants 101a-101n, which may include one or more process units that implement the same, similar, or different processes. The plant-level controllers 130 perform various functions to support the operation and control of components in the lower levels. As particular examples, the plant-level controller 130 could execute one or more manufacturing execution system (MES) applications, scheduling applications, or other or additional plant or process control applications. Each of the plant-level controllers 130 includes any suitable structure for providing access to, control of, or operations related to one or more process units in a process plant. Each of the plant-level controllers 130 could, for example, represent a server computing device running a MICROSOFT WINDOWS operating system.

Access to the plant-level controllers 130 may be provided by one or more operator stations 132. Each of the operator stations 132 includes any suitable structure for supporting user access and control of one or more components in the system 100. Each of the operator stations 132 could, for example, represent a computing device running a MICROSOFT WINDOWS operating system.

At least one router/firewall 134 couples the networks 128 to one or more networks 136. The router/firewall 134 includes any suitable structure for providing communication between networks, such as a secure router or combination router/firewall. The network 136 could represent any suitable network, such as an enterprise-wide Ethernet or other network or all or a portion of a larger network (such as the Internet).

In the Purdue model, "Level 5" may include one or more enterprise-level controllers 138 coupled to the network 136. Each enterprise-level controller 138 is typically able to perform planning operations for multiple plants 101a-101n and to control various aspects of the plants 101a-101n. The enterprise-level controllers 138 can also perform various functions to support the operation and control of components in the plants 101a-101n. As particular examples, the enterprise-level controller 138 could execute one or more order processing applications, enterprise resource planning (ERP) applications, advanced planning and scheduling (APS) applications, or any other or additional enterprise control applications. Each of the enterprise-level controllers 138 includes any suitable structure for providing access to, control of, or operations related to the control of one or more plants. Each of the enterprise-level controllers 138 could, for example, represent a server computing device running a MICROSOFT WINDOWS operating system. In this document, the term "enterprise" refers to an organization having one or more plants or other processing facilities to be managed. Note that if a single plant 101a is to be managed, the functionality of the enterprise-level controller 138 could be incorporated into the plant-level controller 130.

Access to the enterprise-level controllers 138 may be provided by one or more operator stations 140. Each of the operator stations 140 includes any suitable structure for supporting user access and control of one or more components in the system 100. Each of the operator stations 140 could, for example, represent a computing device running a MICROSOFT WINDOWS operating system.

Various levels of the Purdue model can include other components, such as one or more databases. The database(s) associated with each level could store any suitable information associated with that level or one or more other levels of the system 100. For example, a historian 141 can be coupled to the network 136. The historian 141 could represent a component that stores various information about the system 100. The historian 141 could, for instance, store information used during production scheduling and optimization. The historian 141 represents any suitable structure for storing and facilitating retrieval of information. Although shown as a single centralized component coupled to the network 136, the historian 141 could be located elsewhere in the system 100, or multiple historians could be distributed in different locations in the system 100.

In particular embodiments, the various controllers and operator stations in FIG. 1 may represent computing devices. For example, each of the controllers 106, 114, 122, 130, 138 could include one or more processing devices 142 and one or more memories 144 for storing instructions and data used, generated, or collected by the processing device(s) 142. Each of the controllers 106, 114, 122, 130, 138 could also include at least one network interface 146, such as one or more Ethernet interfaces or wireless transceivers. Also, each of the operator stations 116, 124, 132, 140 could include one or more processing devices 148 and one or more memories 150 for storing instructions and data used, generated, or collected by the processing device(s) 148. Each of the operator stations 116, 124, 132, 140 could also include at least one network interface 152, such as one or more Ethernet interfaces or wireless transceivers.

Disclosed embodiments can implement virtual wireless devices in an industrial wireless network, such as the network 104 described above, that aids in eliminating technical issues well in advance of installation in the plant. Before commissioning the network, systems as described herein can determine system stability and performance with maximum capacity load so that any issues can be addressed well in advance of physical installation.

For example, to evaluate a 1000-node network, a typical test implementation requires 1000 actual, physical nodes to resolve all the technical issues of stability and performance. By using the virtual wireless device techniques as disclosed herein, a similar network can be simulated using only 250 actual, physical devices where each physical wireless device acts as four virtual wireless devices, yet yielding the same results as with the 1000-node case.

A virtual wireless device as disclosed herein can emulate the multiple stacks within a physical/actual device, each stack having its own address (such as a MAC address, IP address, IEEE address, or otherwise) and a short address or nickname, at the same time holding the same manufacturer's ID, model, unique serial number, or unique device type identifiers, working as a group of similar devices in the network.

Using virtual wireless devices as disclosed herein helps to resolve all the technical challenges earlier in the system development, which helps in meeting the quality product along with mitigating the risks during the initial phase of development of the wireless network.

Processes and results described herein can be accomplished (among other ways) using a plurality of wireless devices 154. Among other things, each wireless device 154 can implement a plurality of virtual wireless devices.

In this example, each wireless device 154 includes one or more processing devices 156; one or more memories 158 for storing instructions and data used, generated, or collected by the processing device(s) 156; and at least one network interface 160 (wired, wireless, or a combination of these). Each processing device 156 could represent a microprocessor, microcontroller, digital signal process, field programmable gate array, application specific integrated circuit, or discrete logic. Each memory 158 could represent a volatile or non-volatile storage and retrieval device, such as a random access memory or Flash memory. Each network interface 160 could represent an Ethernet interface, wireless transceiver, or other device facilitating external communication. The functionality of the wireless device 154 could be implemented using any suitable hardware or a combination of hardware and software/firmware instructions.

Disclosed embodiments enable the execution of multiple virtual wireless devices on each wireless device 154. Provisioning, use, and interaction with each wireless device 154 can be performed, in some cases, by a provisioning system 170. In this example, the provisioning system 170 includes one or more processing devices 176; one or more memories 178 for storing instructions and data used, generated, or collected by the processing device(s) 176; and at least one network interface 172. Each processing device 176 could represent a microprocessor, microcontroller, digital signal process, field programmable gate array, application specific integrated circuit, or discrete logic. Each memory 178 could represent a volatile or non-volatile storage and retrieval device, such as a random access memory or Flash memory. Each network interface 172 could represent an Ethernet interface, wireless transceiver, or other device facilitating network communication. The functionality of the provisioning system 170 could be implemented using any suitable hardware or a combination of hardware and software/firmware instructions. The provisioning system 170 can be, for example, a stand-alone data processing system, a mobile device, an external server or enterprise system, or otherwise. The exemplary structure of the provisioning system 170 described above is not intended to limit the structure or function of the devices that could be used to implement the provisioning system 170. The network interface 172 can communicate, in some embodiments, using similar protocols as the network interface 160.

Although FIG. 1 illustrates one example of an industrial process control and automation system 100, various changes may be made to FIG. 1. For example, a control and automation system could include any number of sensors, actuators, controllers, servers, operator stations, networks, and other components. Also, the makeup and arrangement of the system 100 in FIG. 1 is for illustration only. Components could be added, omitted, combined, or placed in any other suitable configuration according to particular needs. Further, particular functions have been described as being performed by particular components of the system 100. This is for illustration only. In general, control and automation systems are highly configurable and can be configured in any suitable manner according to particular needs. In addition, FIG. 1 illustrates an example environment in which the functions of wireless devices 154 can be used. This functionality can be used in any other suitable device or system.

There are major challenges faced by industries in deploying, verifying and validating the wireless system well in advance. Disclosed embodiments mitigate the above challenges at the early stages in the plan. According to disclosed embodiments, individual physical wireless devices are used to implement or simulate multiple virtual wireless devices. These virtual wireless devices can be used to model, simulate, and validate the larger network.

Figure 2:
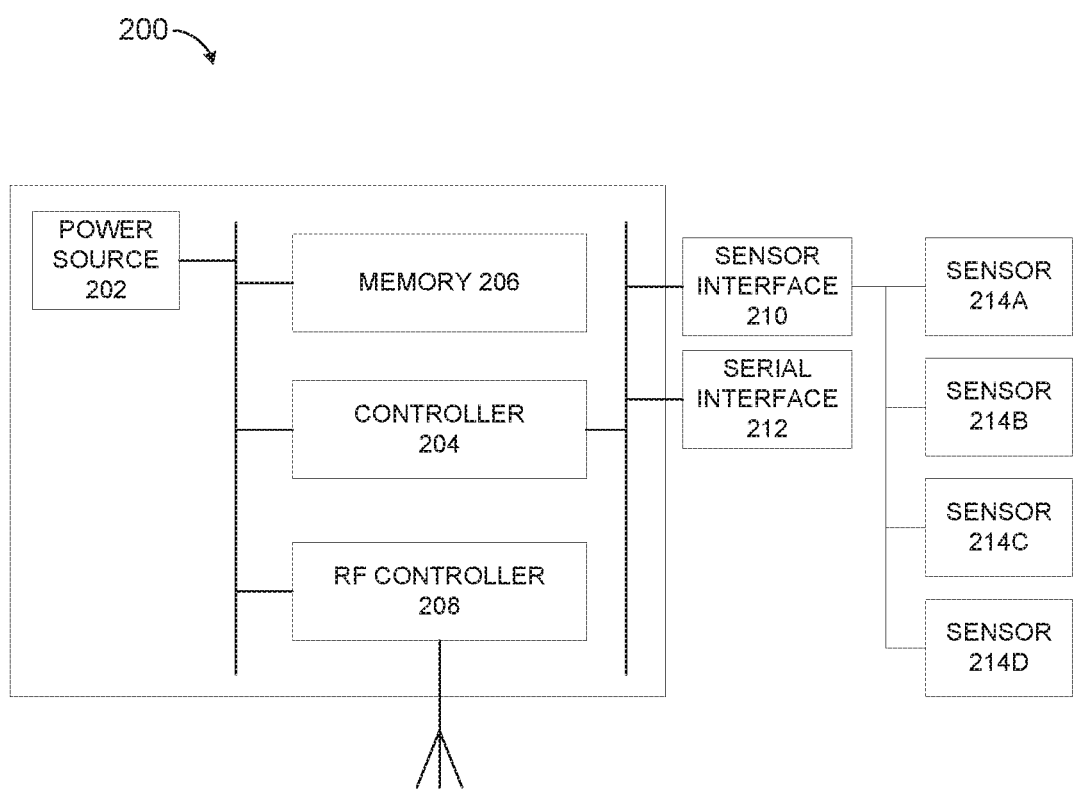
FIG. 2 illustrates a more detailed view of a physical wireless device in accordance with disclosed embodiments.

FIG. 2 illustrates a more detailed view of a physical wireless device 200 that can correspond to wireless device 154. Wireless device 200 includes a power source 202, a memory 206, a controller 204, and a radio-frequency (RF) controller 208, interconnected with each other. Controller 204 is configured to perform processes as described herein, in particular to implement virtual sensor devices as described. RF controller 208 connects to a wireless network in a control system, including, in some embodiments, an industrial control system as in FIG. 1.

Controller 204 also controls a serial interface 212 and a sensor interface 210. Sensor interface 210 can connect with one or more sensors, whether virtual or physical, such as sensors 214A-214D.

Figure 3:
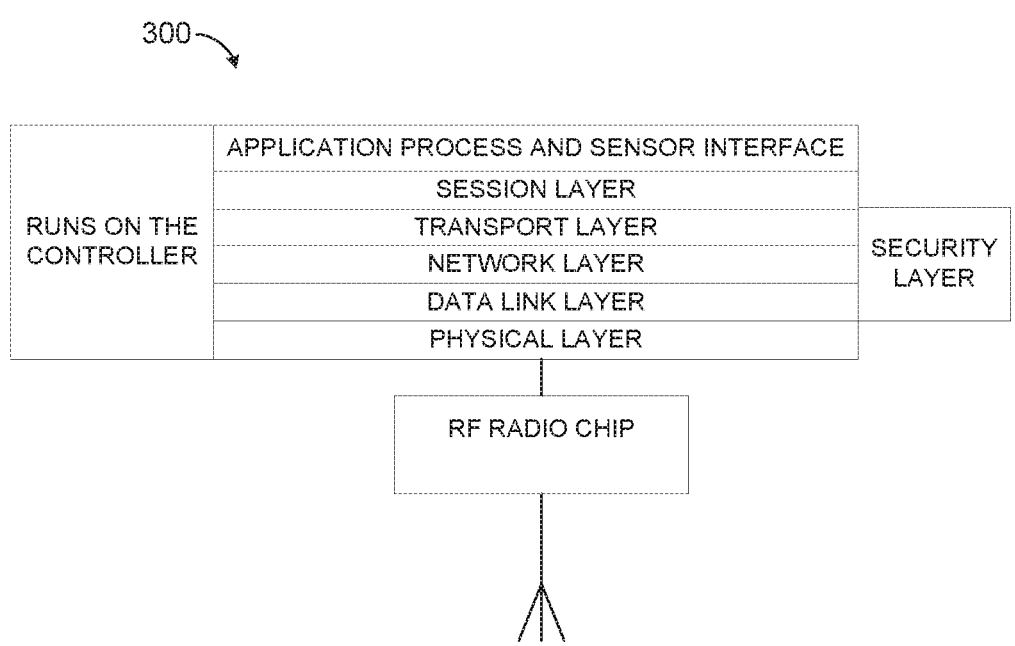
FIG. 3 illustrates software components of an architecture that can be used according to disclosed embodiments.

FIG. 3 illustrates software components of an Open Systems Interconnection (OSI) 7-layer architecture 300 that can be used according to disclosed embodiments.

A physical wireless device, such as physical wireless device 200, has its unique identifiers such as an IEEE address (or other address), manufacturer ID, and device type. When a physical wireless device is emulating multiple virtual wireless devices, each wireless virtual device can use a unique IEEE address, unique serial number and unique device identifier. Based on the number of virtual devices a physical device is creating, these unique identifiers can be loaded into device non-volatile memory during manufacturing.

A virtual device mimics a physical hardware device when, in fact, it exists only in software form on the physical wireless device 200. Therefore, it makes the control system believe that a particular hardware exists when it really does not.

Virtual devices as described herein can be used, for example, to test a 1000-node network, using only 250 actual devices that each simulate four virtual devices. This saves time in the placement of devices in testing and reduces deployment time and increases productivity.

Various embodiments can simulate the virtual device network by using each physical device to simulate multiple virtual devices, or by the network manager itself assigning the links with virtual neighbors.

Figure 4:
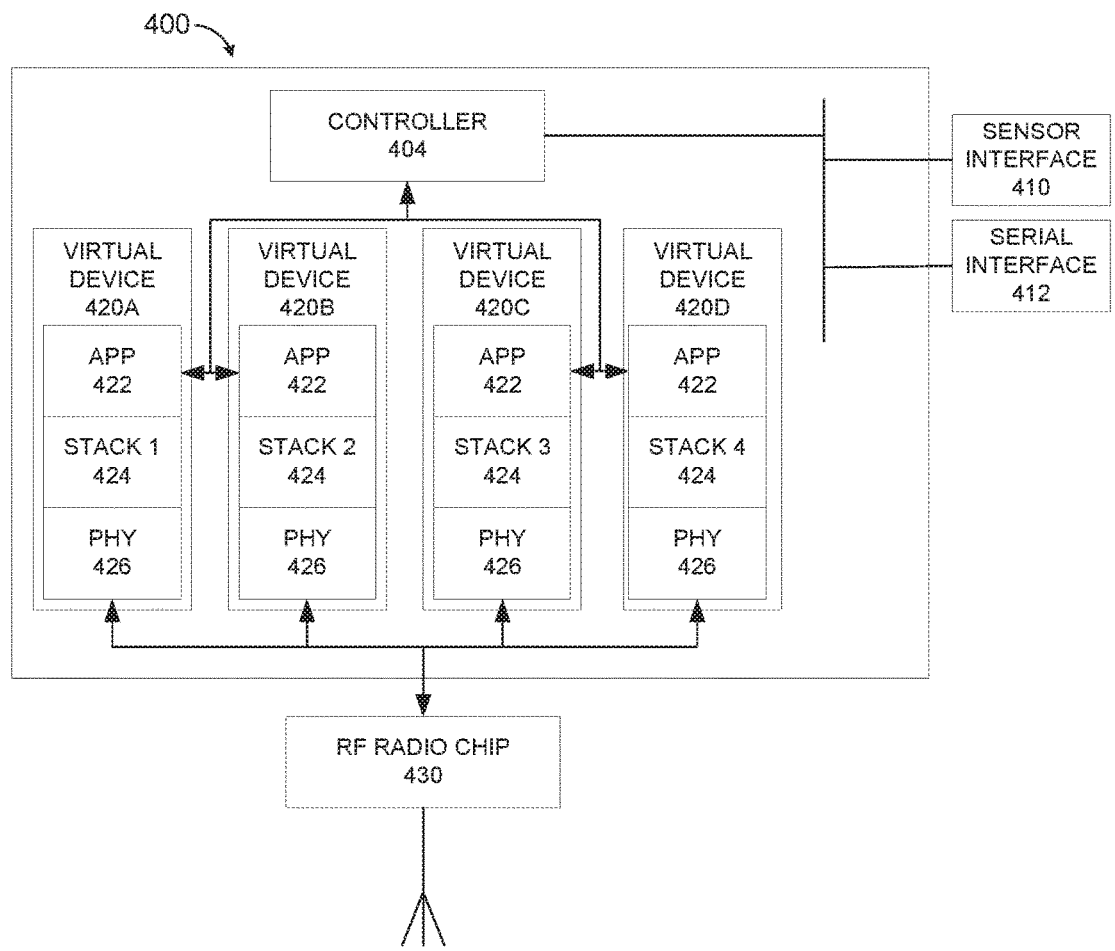
FIG. 4 illustrates a model of virtual devices implemented on a physical device according to disclosed embodiments.

FIG. 4 illustrates a model 400 of virtual devices implemented on a physical device. In this example, controller 404 implements four virtual wireless devices 420A-420D. Each virtual device 420 has an application layer 422, a stack 424 (as, for example, in FIG. 3), and a physical layer 426 that communicates with wireless hardware such as RF radio chip 430. Controller 404 also interacts with sensor interface 410 and serial interface 412.

As illustrated, the virtual devices 420 are implemented on a single physical device, which simulates different stacks, each of them interfacing with same application layer and the physical layer. The application layer interacts, through the controller 404, with the sensor interface 410 and the serial interface 412.

Similar to a physical device, each virtual device also maintains its individual identifiers. For example, each virtual device can have its own IEEE address and nickname. In various embodiments, all virtual devices on a single physical device can hold the same manufactured ID and device type identifiers. These identifiers can be written to the device using the serial interface and can be stored in persistent memory.

In a wireless TDMA network, each device can have its own timeslot, frequency, and other required parameters. In such an implementation, each virtual device will get its own transmit and receive slots, hence collision and transmission issues are not an issue.

The stack 424 or application maintains the device state machine for each virtual device, and implements a device provisioning module and management module. In various embodiments, each virtual device in a physical device users a common provisioning and management module, while each of the virtual devices has its own state machine.

Figure 5:
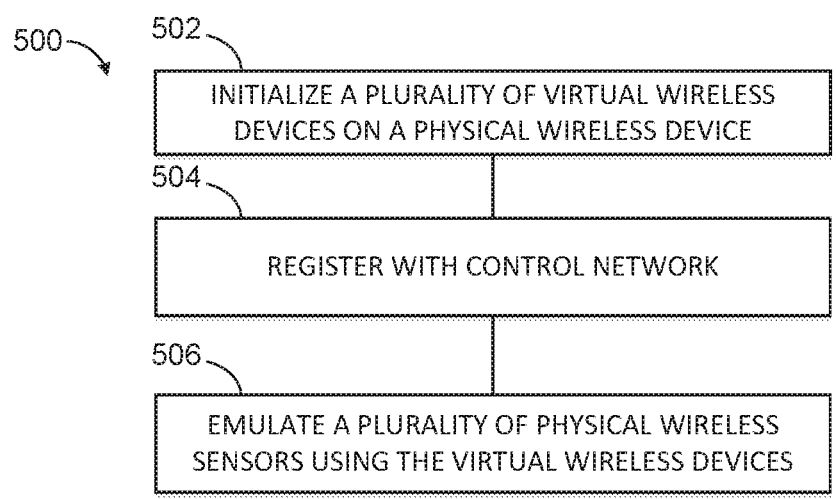
FIGS. 5 and 6 illustrate processes in accordance with disclosed embodiments.

FIG. 5 illustrates a process 500 in accordance with disclosed embodiments.

A physical wireless device initializes a plurality of virtual wireless devices executing on the physical wireless device (502). In various embodiments, each virtual wireless device acts as a physical wireless sensor. Each virtual wireless device includes an application layer that executes a wireless sensor application and includes a virtualized physical layer that interacts with wireless hardware.

The physical wireless device registers with a control network (504). A specific implementation of joining the physical wireless device and the virtual wireless devices to the control network is described herein. The control network can be an industrial control network or, for example, a simulated industrial control network.

The physical wireless device emulates a plurality of physical wireless sensors, in the control network, using the virtual wireless devices (506). According to disclosed embodiments, each of the virtual wireless devices stores or is assigned attributes of a physical wireless device, such as a unique network address (such as an IEEE address), a short address, a nickname, a manufacturer ID, or a device type identifier. Each virtual wireless device, for example, can communicate using its network address, short address, or nickname as if it were a physical wireless device.

Figure 6:
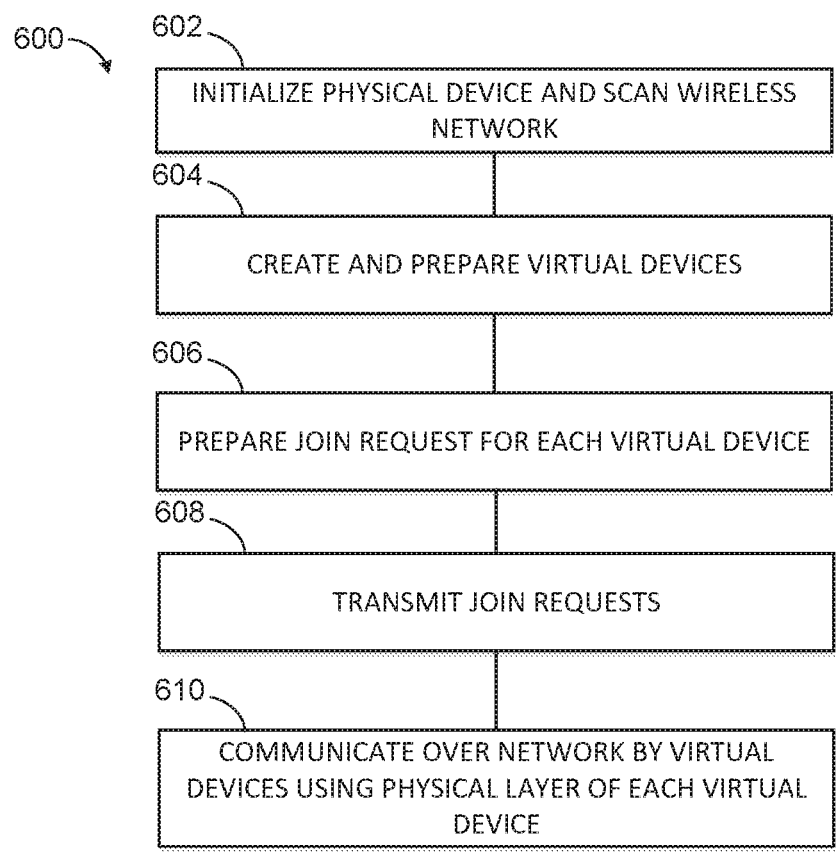

FIG. 6 illustrates a process 600 in accordance with disclosed embodiments, that can be used as a specific implementation of processes as described herein.

The physical device initializes and scans the wireless network (602). In some cases, this can include scanning for initial sync messages (advertisements), or in other cases this can include scanning a WiFi or other wireless network.

Once the advertisement is received, the physical device can create and prepare the virtual device(s) (604). This can include any initialization or other tasks needed to activate the virtual devices to perform processes as described herein.

Each virtual device implemented by the physical device prepares a Join Message and adds it to the queue, one after the other, based on the number of virtual devices configured (606). Each of these Join Messages corresponds to a different virtual wireless device. In preparing the Join Messages and filling the downlink message header, the source address is filled based on the physical device and the virtual devices. For example, a given virtual device may have a source address equal to the last byte of the physical device address plus 100.

The physical device transmits all of the Join Messages on the same transmission link received in the advertisement (608). Each Join Message may be transmitted at different times. Steps 602-608 can be part of registering on the control network as described above.

The physical device uses the physical layer on each virtual device to filter, send, and receive messages, and otherwise communicate, from the physical device and the virtual devices (610). In this way, each of the virtual devices emulates an individual physical device. Once a Join Response is received, each virtual device will have its own short address and the network session established. Further communications can then be based on the short address and the network sessions, assigned by the network manager.

Disclosed embodiments provide multiple technical advantages. For example, disclosed embodiments can accurately simulate scaling of the network. When simulating a 1000-node network, conventional computer simulation will not give the accurate results for RF loss, Propagation, attenuations, RSSI, etc. However, using disclosed techniques with the virtual wireless devices, issues arising from network scaling can be properly evaluated and addressed.

Disclosed embodiments reduce dependency on additional hardware, thereby reducing costs. To purchase 1000 devices, a significant amount of capital is required. Placement of the devices becomes tedious to test the real environment scenarios, which may result in inaccurate RF information.

Disclosed embodiments produce an improved wireless device simulation network that is simple and secured, with resource sharing. As multiple virtual devices are simulated using a lesser number of physical devices, the number of actual devices competing will be relatively less, so that network resources are utilized efficiently.

Disclosed embodiments provide easy maintenance and application provisioning. Time required for provisioning and configuration of the devices can be as little as, for example, one quarter of the time involved with conventional systems.

In some embodiments, various functions described in this patent document are implemented or supported by a computer program that is formed from computer readable program code and that is embodied in a computer readable medium. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

It may be advantageous to set forth definitions of certain words and phrases used throughout this patent document. The terms "application" and "program" refer to one or more computer programs, software components, sets of instructions, procedures, functions, objects, classes, instances, related data, or a portion thereof adapted for implementation in a suitable computer code (including source code, object code, or executable code). The term "communicate," as well as derivatives thereof, encompasses both direct and indirect communication. The terms "include" and "comprise," as well as derivatives thereof, mean inclusion without limitation. The term "or" is inclusive, meaning and/or. The phrase "associated with," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, have a relationship to or with, or the like. The phrase "at least one of," when used with a list of items, means that different combinations of one or more of the listed items may be used, and only one item in the list may be needed. For example, "at least one of: A, B, and C" includes any of the following combinations: A, B, C, A and B, A and C, B and C, and A and B and C.

While this disclosure has described certain embodiments and generally associated methods, alterations and permutations of these embodiments and methods will be apparent to those skilled in the art. Accordingly, the above description of example embodiments does not define or constrain this disclosure. Other changes, substitutions, and alterations are also possible without departing from the spirit and scope of this disclosure, as defined by the following claims.

What is claimed is:

1. A method comprising:
   initializing, by a physical wireless device, a plurality of virtual wireless devices executing on the physical wireless device;
   registering with a control network by the physical wireless device to create and prepare at least one of the plurality of virtual wireless devices comprising:
      scanning the control network for initial sync messages;
      activating at least one of the plurality of virtual wireless devices based on receiving of an initial sync message;
      preparing by the activated virtual wireless device Join Messages;
      transmitting by the physical wireless device over the control network the Join Messages to the corresponding virtual wireless devices; and
   emulating a plurality of wireless sensors, by the physical wireless device and in the control network, by using the virtual wireless devices, wherein each virtual wireless device communicates over the control network using an assigned network address, short address, or nickname as if the virtual wireless device were a physical wireless device.

2. The method of claim 1, wherein the control network is an industrial control network or a simulated industrial control network.

3. The method of claim 1, wherein each virtual wireless device includes an application layer that executes a wireless sensor application and includes a virtualized physical layer that interacts with wireless hardware of the physical wireless device.

4. The method of claim 1, wherein each of the virtual wireless devices stores attributes of a regular physical wireless device, including at least one of a unique network address, a short address, a nickname, a manufacturer ID, or a device type identifier.

5. The method of claim 1, wherein registering with the control network includes sending a plurality of join messages, each corresponding to a different virtual wireless device, to the control network.

6. The method of claim 5, wherein each join message is sent to the control network on an identical transmission link.

7. The method of claim 1, wherein an emulated physical layer on each virtual wireless device is used to filter, send, and receive messages over the control network.

8. A physical wireless device, comprising:
   a controller;
   a memory; and
   wireless hardware;
   wherein the controller is configured to:
      initialize a plurality of virtual wireless devices executing on the physical wireless device;
      register with a control network to create and prepare at least one of the plurality of virtual wireless devices comprising:
         scan the control network for initial sync messages;
         activate at least one of the plurality of virtual wireless devices based on receiving of an initial sync message;
         prepare by the activated virtual wireless device Join Messages;
         transmit by the physical wireless device over the control network the Join Messages to the corresponding virtual wireless devices; and
      emulate a plurality of wireless sensors in the control network, by using the virtual wireless devices, wherein each virtual wireless device communicates over the control network using an assigned network address, short address, or nickname as if the virtual wireless device were a physical wireless device.

9. The physical wireless device of claim 8, wherein the control network is an industrial control network or a simulated industrial control network.

10. The physical wireless device of claim 8, wherein each virtual wireless device includes an application layer that executes a wireless sensor application and includes a virtualized physical layer that interacts with wireless hardware of the physical wireless device.

11. The physical wireless device of claim 8, wherein each of the virtual wireless devices stores attributes of a regular physical wireless device, including at least one of a unique network address, a short address, a nickname, a manufacturer ID, or a device type identifier.

12. The physical wireless device of claim 8, wherein to register with the control network, the controller is configured to send a plurality of join messages, each corresponding to a different virtual wireless device, to the control network.

13. The physical wireless device of claim 12, wherein each join message is sent to the control network on an identical transmission link.

14. The physical wireless device of claim 8, wherein an emulated physical layer on each virtual wireless device is used to filter, send, and receive messages over the control network.

15. A non-transitory machine-readable medium encoded with executable instructions that, when executed, cause one or more controllers of a physical wireless device to:
   initialize a plurality of virtual wireless devices executing on the physical wireless device;
   register with a control network to create and prepare at least one of the plurality of virtual wireless devices comprising:
      scan the control network for initial sync messages;
      activate at least one of the plurality of virtual wireless devices based on receiving of an initial sync message;
      prepare by the activated virtual wireless device Join Messages;
      transmit by the physical wireless device over the control network the Join Messages to the corresponding virtual wireless devices; and
   emulate a plurality of wireless sensors in the control network, by using the virtual wireless devices, wherein each virtual wireless device communicates over the control network using an assigned network address, short address, or nickname as if the virtual wireless device were a physical wireless device.

16. The non-transitory machine-readable medium of claim 15, wherein the control network is an industrial control network or a simulated industrial control network.

17. The non-transitory machine-readable medium of claim 15, wherein each virtual wireless device includes an application layer that executes a wireless sensor application and includes a virtualized physical layer that interacts with wireless hardware of the physical wireless device.

18. The non-transitory machine-readable medium of claim 15, wherein each of the virtual wireless devices stores attributes of a regular physical wireless device, including at least one of a unique network address, a short address, a nickname, a manufacturer ID, or a device type identifier.

19. The non-transitory machine-readable medium of claim 15, wherein registering with the control network includes sending a plurality of join messages, each corresponding to a different virtual wireless device, to the control network.

20. The non-transitory machine-readable medium of claim 19, wherein each join message is sent to the control network on an identical transmission link.

* * * * *